(12) United States Patent
Carson et al.

(10) Patent No.: US 7,528,507 B2
(45) Date of Patent: May 5, 2009

(54) CURRENT SENSING LOAD DEMAND APPARATUS AND METHODS

(76) Inventors: Anthony Carson, 6710 S. 111th East Ave., Tulsa, OK (US) 74133; Bryan Noland, 1515 S. Evanston Ave., Tulsa, OK (US) 74104

( * ) Notice: Subject to any disclaimer, the term of this patent is extended or adjusted under 35 U.S.C. 154(b) by 0 days.

(21) Appl. No.: 11/842,594

(22) Filed: Aug. 21, 2007

(65) Prior Publication Data

US 2008/0049367 A1   Feb. 28, 2008

Related U.S. Application Data

(60) Provisional application No. 60/823,455, filed on Aug. 24, 2006.

(51) Int. Cl.
*H01H 83/00* (2006.01)
(52) U.S. Cl. .................................................. 307/116
(58) Field of Classification Search ................ 307/116
See application file for complete search history.

(56) References Cited

U.S. PATENT DOCUMENTS 5,565,714 A   10/1996  Cunningham 6,678,131 B2   1/2004  Chapman
2007/0086126 A1 *  4/2007  Baxter ..................... 361/42

OTHER PUBLICATIONS

International Search Report PCT/US 2007/18675; received from Patent Cooperation Treaty Jun. 20, 2008; 6 pages.

* cited by examiner

*Primary Examiner*—Robert L. Deberadinis
(74) *Attorney, Agent, or Firm*—Howard & Howard Attorneys PLLC

(57) ABSTRACT

An apparatus supplies AC power to a load. The apparatus includes a set output terminals, a primary circuit, and a load sensing circuit. The primary circuit is electrically coupled to a source of AC power and to the output terminals for selectively providing power at a low voltage at the output terminals or electronically coupling the source of AC power directly to the output terminals. The load sensing circuit coupled to the primary circuit and the source of AC power for determining a resistance associated with the load at initial application of the load and controlling the primary circuit to electronically couple the source of AC power directly to the output terminals if a proper load is detected.

20 Claims, 7 Drawing Sheets

FIG - 6
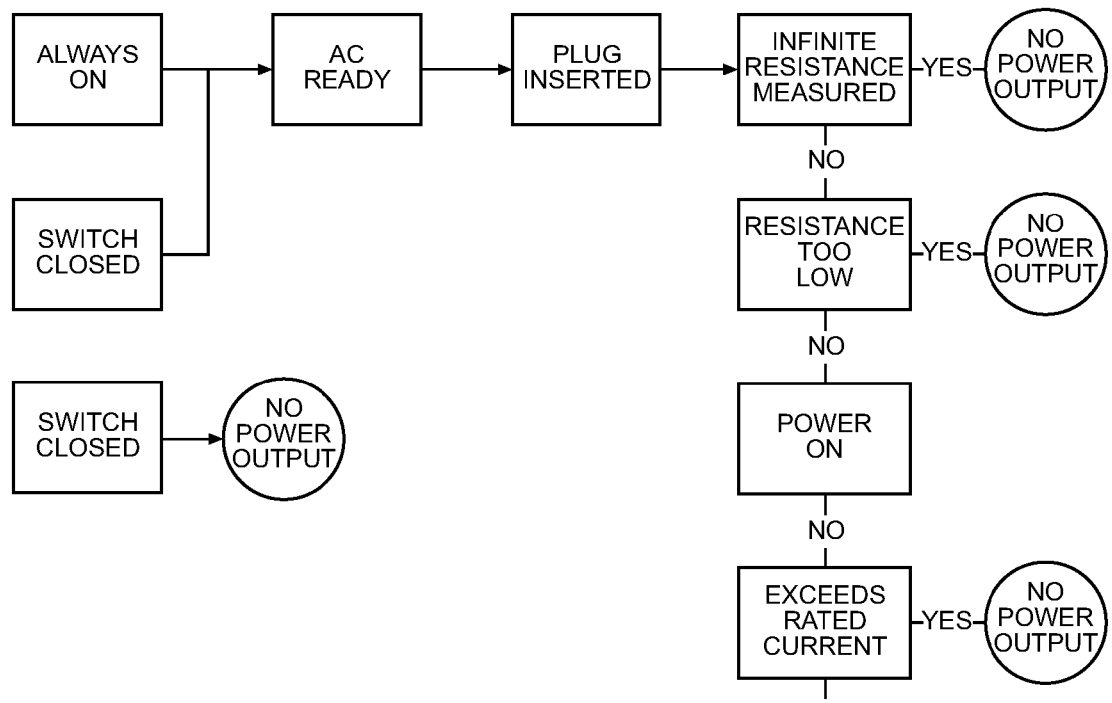
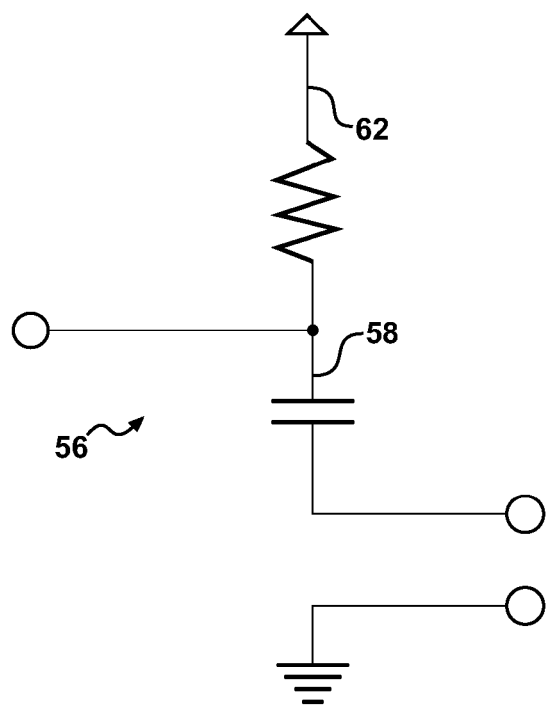
FIG - 7

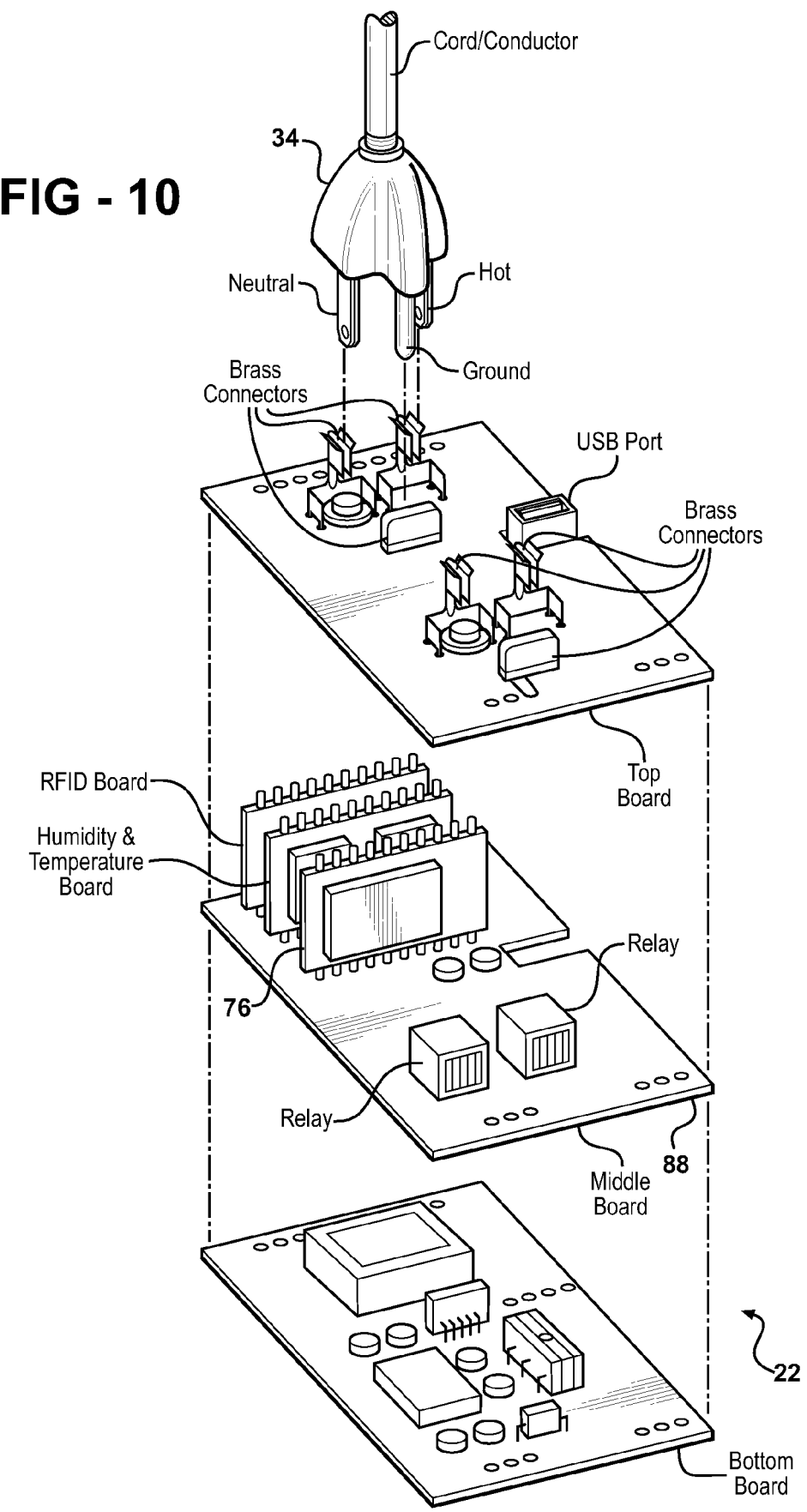

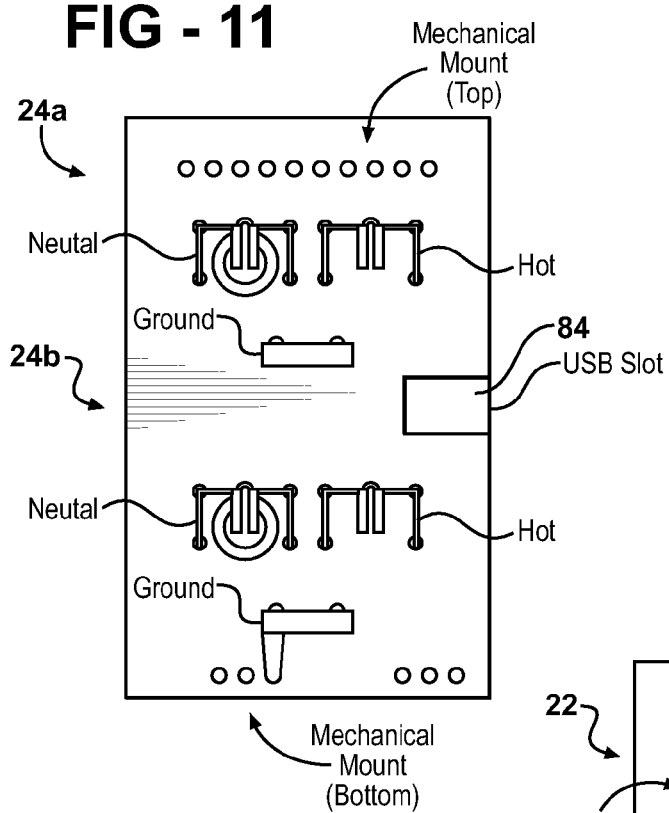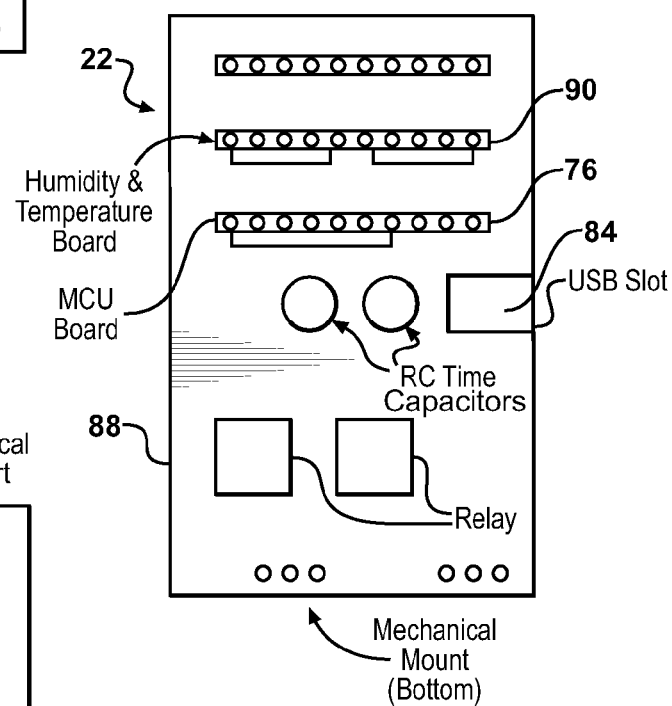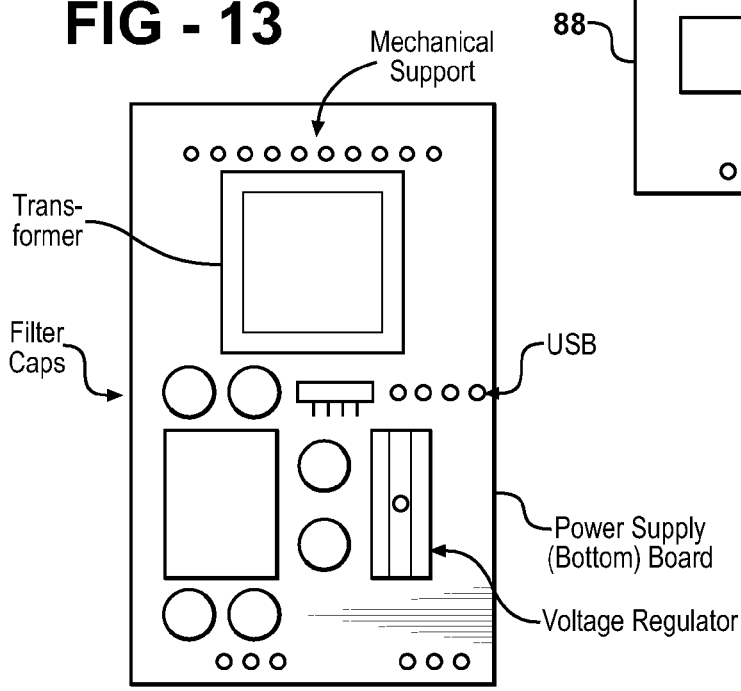

CURRENT SENSING LOAD DEMAND APPARATUS AND METHODS

RELATED APPLICATION

This applications claims priority to U.S. Provisional Patent Application Ser. No. 60/823,455, filed Aug. 24, 2006, the entire specification of which is hereby expressly incorporated by reference.

FIELD OF THE INVENTION

This description relates generally to electrical receptacles and more particularly to a method of load verification of an electrical current demand, which ensures such demand does not exceed the operational parameters of said receptacles.

BACKGROUND

Conventional electrical receptacles used in industrial, commercial and residential applications deliver electricity to a variety of electrical appliances. The receptacles manufactured today have a hard Lexan plastic enclosure and deliver a hot, neutral and ground to said electrical appliances via a plug which is inserted into three of the six holes in a typical grounded application. Voltage and current travel through the hot conductor to the appliance circuit. If the appliance circuit is switched on, the voltage and current flow through to the neutral conductor completing the circuit. The circuit has an inherent resistance associated with the appliance load demand whereby the resistance determines the load requirement. If there is no resistance in the circuit, it is a short between the hot conductor and neutral conductor and if the resistance is infinite then there is an open short on one of the conductors. The description set forth in this patent describes in sufficient detail a circuit which determines these conditions of resistance before delivering the voltage and current to the hot conductor of the appliance and it is understood that various electronic designs changes could be made without departing from the scope or the spirit of the related art.

Electrical receptacles configured to eliminate arc faults rather than merely detect such faults with attendant circuit disconnection; the invention contemplates low-cost, child-safe electrical receptacles useful in residential situations and which can be fitted within the confines of single gang enclosures. The safety receptacles of the invention can be used in all use situations including residential, commercial and industrial applications to increase safe use of electrical receptacles in residential applications in particular and to decrease industrial liabilities. In essence, the safety receptacles of the invention prevent arcing during insertion of a plug into the receptacle, during residence of the plug in the receptacle and during removal of the plug from the receptacle with a substantial load to the receptacle while determining the load demand does not exceed the receptacle's electrical specification.

An arc fault circuit interrupter (AFCI) is a circuit breaker designed to prevent fires by detecting non-working electrical arcs and disconnect power before the arc starts a fire. Advanced electronics inside an AFCI breaker detect sudden bursts of electrical current in milliseconds, long before they would trip a regular overcurrent circuit breaker or fuse. The AFCI should distinguish between a working arc that may occur in the brushes of a vacuum sweeper, light switch, or other household devices and a non-working arc that can occur, for instance, in a lamp cord that has a broken conductor in the cord from overuse. Arc faults in a home is one of the leading causes for household fires.

AFCIs resemble a GFCI/RCD (Ground-Fault Circuit Interrupt/Residual-Current Device) in that they both have a test button, though it is important to distinguish between the two. GFCIs are designed to protect against electrical shock, while AFCIs are primarily designed to protect against fire Starting with the 1999 version of the National Electrical Code in the United States and the 2002 version of the Canadian Electrical Code in Canada, AFCI are now required in all circuits that feed receptacles in bedrooms of dwelling units. The National Electrical Code is an industry consensus document adopted by many U.S. municipalities. This requirement of the NEC is typically accomplished by using a kind of circuit-breaker (defined by UL 1699) in the breaker panel that provides combined arc-fault, ground-fault, and over-current protection. The ground-fault protection is intended to prevent fire from arcs to ground and works at a higher threshold (30 mA) than the GFCI/RCD (Ground-Fault Circuit Interrupt/Residual-Current Device) implementations protecting against the safety hazard of electric shock (which operate at 6 mA). Combined devices are available which trip at the lower, 6 mA threshold of a true GFCI/RCD.

Even AFCI's do not, however, provide protection against all of the possible circuit faults that could ignite a fire. In particular, they provide no special protection against so-called "glow faults" where a relatively low-resistance short circuit draws a modest amount of current (within the trip limits of the circuit breaker) but heats the localized area of the fault to red heat. Glow faults also can occur where a connection in series with a load suddenly develops a high resistance; this might be the result of a now-defective switch, socket, plug, or wire connection (series faults are observed with special frequency in aluminum wire junctions). No practical circuit breaker could detect either such fault as there is no measurable characteristic that any circuit breaker could employ to distinguish a glow fault from the normal operation of a branch circuit.

Power outlets or receptacles are designed for power distribution through out various structures around the world and are designed with ease of manufacturing and installation design standards. If a short by a conductor is connected between the Neutral and Hot side of a receptacle, the said receptacle will arc, possibly causing fire or electrocution. In the Patent Chapman et al; U.S. Pat. No. 6,678,131: Arc-safe electrical receptacles the use of a "Quench arc circuit" is utilized to reduce the arc between the contact points whereby said contact points are bypassed by aforementioned capacitor based quench arc circuit. Closely examining the circuit, one can determine the hot side of the quench arc circuit would short to ground causing discharge of electrical flow prior to contact closure.

Electrical receptacle outlets in walls and floors may present shock and electrical fire hazards to consumers. The U.S. Consumer Product Safety Commission estimates that 3,900 injuries associated with electrical receptacle outlets are treated in hospital emergency rooms each year. Approximately a third of these injuries occur when young children insert metal objects, such as hair pins and keys, into the outlet, resulting in electric shock or burn injuries to the hand or finger. CPSC also estimates that electric receptacles are involved in 5,300 fires annually which claim 40 lives and injured 110 consumers. Outlets with poor internal contacts or loose wire terminals may become overheated and emit sparks. Even a receptacle with nothing plugged into it may run hot if it is passing current through to other outlets on the same circuit. To prevent damage to receptacles, appliances should be switched-off before unplugging from a receptacle.

The present invention is aimed at one or more of the problems described above.

SUMMARY OF THE INVENTION

In one aspect of the present invention, an apparatus for supplying AC power to a load is provided. The apparatus includes a set output terminals, a primary circuit, and a load sensing circuit. The primary circuit is electrically coupled to a source of AC power and to the output terminals for selectively providing power at a low voltage at the output terminals or electronically coupling the source of AC power directly to the output terminals. The load sensing circuit coupled to the primary circuit and the source of AC power for determining a resistance associated with the load at initial application of the load and controlling the primary circuit to electronically couple the source of AC power directly to the output terminals if a proper load is detected.

In a second aspect of the present invention, an apparatus for supplying AC power to a load is provided. The apparatus includes a primary circuit and a load sensing circuit. The primary circuit is electrically coupled to a source of AC power. The source of AC power has a neutral terminal and a positive terminal. The primary circuit includes a power supply and voltage regulator circuit, a first switch, and a second switch. The power supply and voltage regulator circuit is electrically coupled to the neutral and positive terminals and supplies power at a low voltage. The first switch is coupled to the power supply and voltage regulator circuit, for sensing application of a load and responsively electrically coupling the power supply and voltage regulator circuit to the load. The second switch is electrically coupled between the first switch and the load and having a first position where the first switch and the load are electrically coupled and a second position where the source of AC power is electrically coupled directly to load. The load sensing circuit is coupled to the power supply and voltage regulator circuit for determining a resistance of the load after application of the load and controlling the switch to move to the second position if a proper load is detected.

In a third aspect of the present invention, a receptacle for supplying AC power to a load is provided. The load has an associated electrical plug. The receptacle includes a set of outlet terminals, an outlet, a primary circuit, and a load sensing circuit. The outlet receives the electrical plug associated with the load. The outlet has at least two associated electrical connectors electrically coupled to the outlet terminals for providing electrical connection to associated prongs of the electrical plug. The primary circuit is electrically coupled to a source of AC power and to the output terminals. The source of AC power has a neutral terminal and a positive terminal. The primary circuit includes a power supply and voltage regulator circuit, which is electrically coupled to the neutral and positive terminals and supplies power at a low voltage, and first and second switches. The first switch is coupled to the power supply and voltage regulator circuit, for sensing insertion of the electrical plug into the outlet and responsively electrically coupling the power supply and voltage regulator circuit to the load. The second switch is electrically coupled between the first switch and the output terminals and has a first position where the first switch and the output terminals are electrically coupled and a second position where the source of AC power is electrically coupled directly to the output terminals. The load sensing circuit is coupled to the power supply and voltage regulator circuit for determining a resistance of the load after insertion of the electrical plug into the outlet and controlling the switch to move to the second position if a proper load is detected.

BRIEF DESCRIPTION OF DRAWINGS

FIG. 6 is a logical flow diagram of input hardware which depicts operational conditions based on load qualifications, according to an embodiment of the present invention;

FIG. 7 is a schematic of a RCTIME circuit, for use in an apparatus for providing AC power to a load, according to an embodiment of the present invention;

FIG. 10 is an exploded view of an apparatus for providing AC power to a load embodied in a receptacle with three boards, according to an embodiment of the present invention;

FIG. 11 is a downward view of a top board, of the apparatus of FIG. 10, outlining the neutral, hot and ground with a neutral side sensor and mechanical supports;

FIG. 12 is a downward view of the middle board, of the apparatus of FIG. 10, outlining the MCU board, relative humidity/temperature board, and the RFID board along with power switching relays; and, FIG. 13 shows a downward view of the power supply and the mechanical supports of the apparatus of FIG. 10.

DETAILED DESCRIPTION

With reference to the drawings and in operation, the present invention provides an apparatus 10 for supplying AC Power to a load 12.

Figure 1:
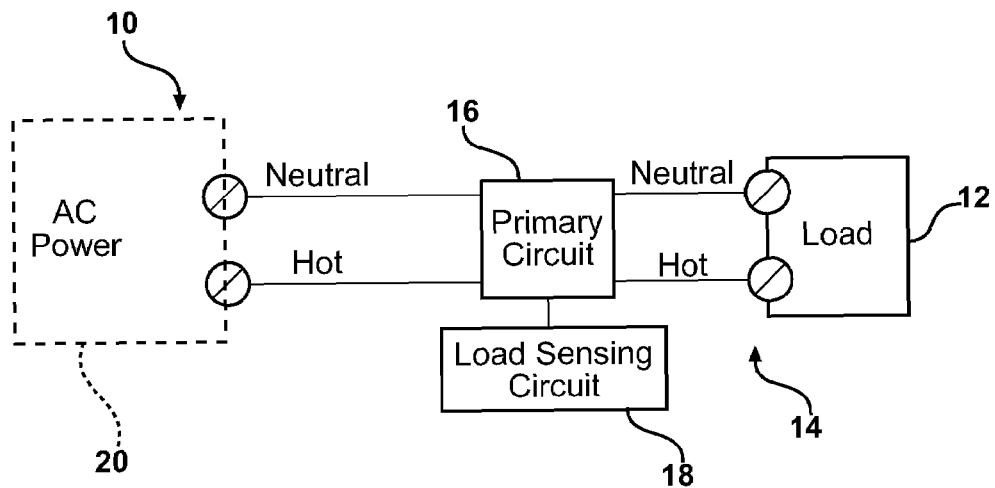
FIG. 1 is a block diagram of an apparatus for providing AC power to a load, according to one aspect of the present invention.

With particular reference to FIG. 1, the apparatus 10 includes a pair of output terminals 14, a primary circuit 16, and a load sensing circuit 18. The primary circuit 16 is electrically coupled to a source of AC power 20 and to the output terminals 14. The primary circuit 16 selectively provides power at a low voltage at the output terminals 14 or electronically couples the source of AC power 20 directly to the output terminals 14. In one aspect of the present invention, the primary circuit 16 provides power at the low voltage at the application of the load 12.

The load sensing circuit 18 is coupled to the primary circuit 16 and the source of AC power 10. The load sensing circuit 18 determines a resistance associated with the load 12 at initial application of the load 12 and controls the primary circuit 16 to electronically couple the source of AC power 20 directly to the output terminals 14 if a proper load is detected.

For example, as explained below, the apparatus 10 may be embodied in a receptacle into which an electrical plug of a load, e.g., a vacuum or light is inserted. A specific load has a certain load characteristics which defines the current required or drawn by the load when applied to the source of AC power. However, during the insertion of the plug into the receptacle, the load has a different set of characteristics which may draw a different current, referred to as the inrush current. If the load is improper, e.g., there is a short circuit, the load or resistance of the load during the application of the load will be negligible, i.e., zero or almost zero.

In one aspect of the present invention, the load sensing circuit 18 continues to supply power at the low voltage at least during initial load characteristics associated with the application of the load 12.

In another aspect of the present invention, as discussed below, the apparatus 10 supplies no power to the output terminals 14 when no load is present, supplies power at the low voltage during application of the load, e.g., insertion of an electrical plug, and supplies AC power to the load if a proper load is detected.

In another aspect of the present invention, the load sensing circuit 18 determines a resistance associated with the load 12 after initial application of the load 12, if a proper load is not previously detected and confirms that the load is not proper as a function of the resistance associated with the load after initial application of the load. In some instances, a proper load may appear to the load sensing circuit 18 like an improper load at insertion or application of the load. For example, a lamp or lightbulb may appear as a short during insertion or application of the load. Therefore, in one embodiment, the load sensing circuit 18 may "double-check" to determine if the previously "improper" load matches the load characteristics of a proper load at some time after initial application.

With particular reference to FIGS. 2, 5, and 10-13, in one embodiment of the present invention, the apparatus 10 is embodied in an electrical receptacle 22 which is adapted to receive electrical plugs corresponding to various loads in a conventional manner. As shown, the electrical receptacle 22 include first and second outlets 24A, 24B.

Figure 2:
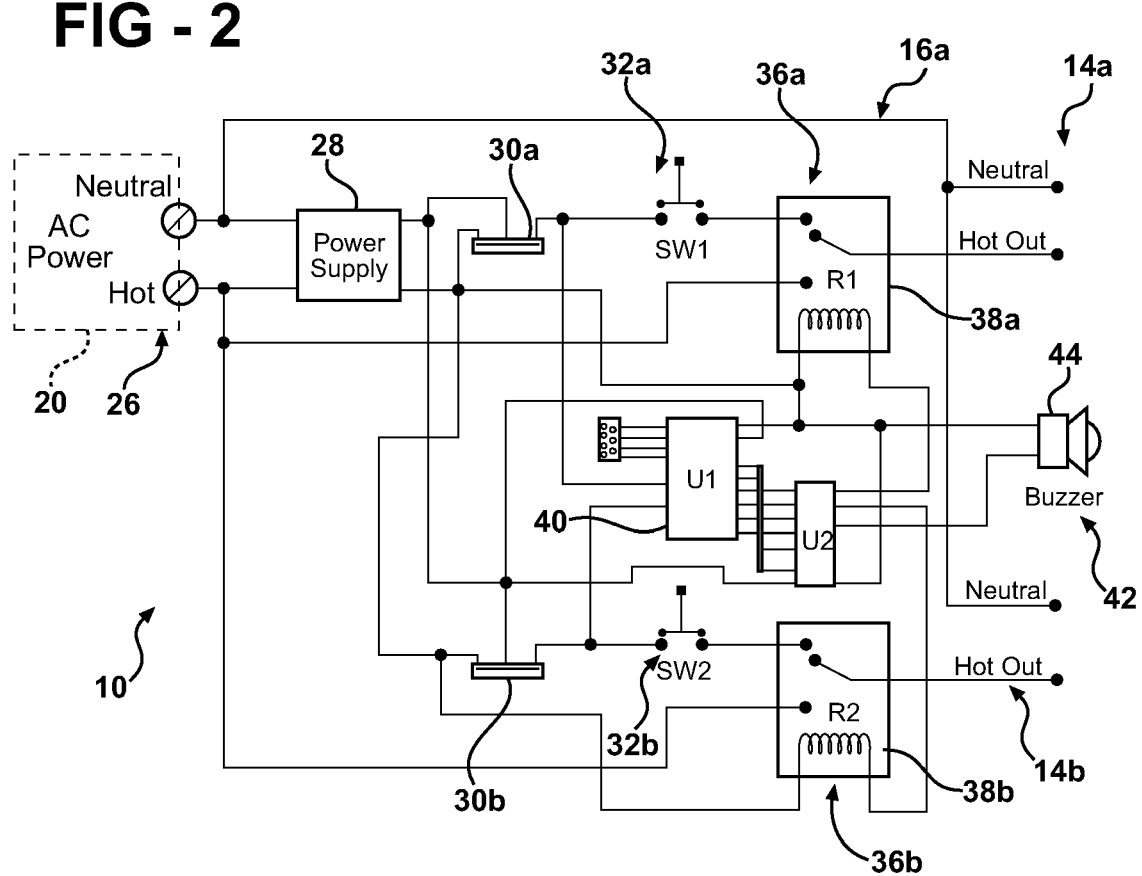
FIG. 2 is a schematic diagram of a plurality of load sensing circuits provided for standard plug configurations, according to an embodiment of the present invention.

With particular reference to FIG. 2, in one embodiment the apparatus 10 includes a first primary circuit 16A and a second primary circuit 16B. Incoming hot terminals 26 (which are connected to the source of AC power 20) feed into the first and second primary circuits 16A, 16B. The first primary circuit 16A utilizes incoming voltage and current to pass through a power supply 28 (60 mA) where a small amount of current flow through a 5 volt voltage regulator 30A (LM317) to allow a safer and lower voltage to pass through the initial load via a first switch 32A (SW1). In the illustrated embodiment, With particular reference to FIG. 10, in the illustrated embodiment, the first switch 32A is located in the neutral side of the female plug insertion and is mechanically actuated by the insertion of adjoining male plug 34.

Returning to FIG. 2, the first primary circuit includes a contactor 36A (which is embodied in a first relay 38A in the illustrated embodiment) and the load sensing circuit 18 include a microcontroller 40. The 5 volts leaving the voltage regulator 30A junctions to an input of the microcontroller 40 input where firmware coding incrementally divides the voltage into 256 segments (0-255 respectively). As the resistance to the 5 volt input increases, the current demand decreases. If there is no resistance then there is a short across the output hot and the output neutral and the load sensing circuit 18 does not actuate the contactor 36sA. If the resistance is too high for the rating of the plug, the load sensing circuit 18 does not actuate the first contactor 36A. Pending proper resistance detection, the load sensing circuit 18 actuates the first contactor 36A, thus directly connecting the output terminals with the source of AC power 10.

In one embodiment, the apparatus 10 may include an indicator 44 electrically connected to both the first and second primary circuits 16A, 16B. If first and second scenario occurs, the microcontroller 40 can utilize the indicator 42 such as a buzzer 44 or an LED indicator or both to provide a status signal, i.e., proper or improper load.

The second primary circuit 16B utilizes incoming voltage and current to pass through the power supply 28 (60 mA) where a small amount of current flow through a second 5 volt voltage regulator 30B (LM317) to allow a safer and lower voltage to pass through the initial load via a second first switch (SW2). The 5 volts leaving the second voltage regulator 30B junctions to an input of the microcontroller 40 where firmware coding incrementally divides the voltage into 256 segments (0-255 respectively). As the resistance to the 5 volt input increases, the current demand decreases. If there is no resistance then there is a short across the output hot and the output neutral and the load sensing circuit 18 does not actuate a second contactor 36B (which is embodied in a first relay 38A (R2) in the illustrated embodiment). If the resistance is too high for the rating of the plug, the load sensing circuit 18 does not actuate the second contactor 36B. Pending proper resistance detection, the load sensing circuit 18 actuates the second contactor 36B, thus directly connecting the output terminals with the source of AC power 10. If first and second scenario occurs, the microcontroller 40 can utilize the indicator 42.

In the illustrated embodiment, the apparatus 10 utilizes a single microcontroller 40 for both primary circuits 16A, 16B and a single indicator 42.

Figure 3:
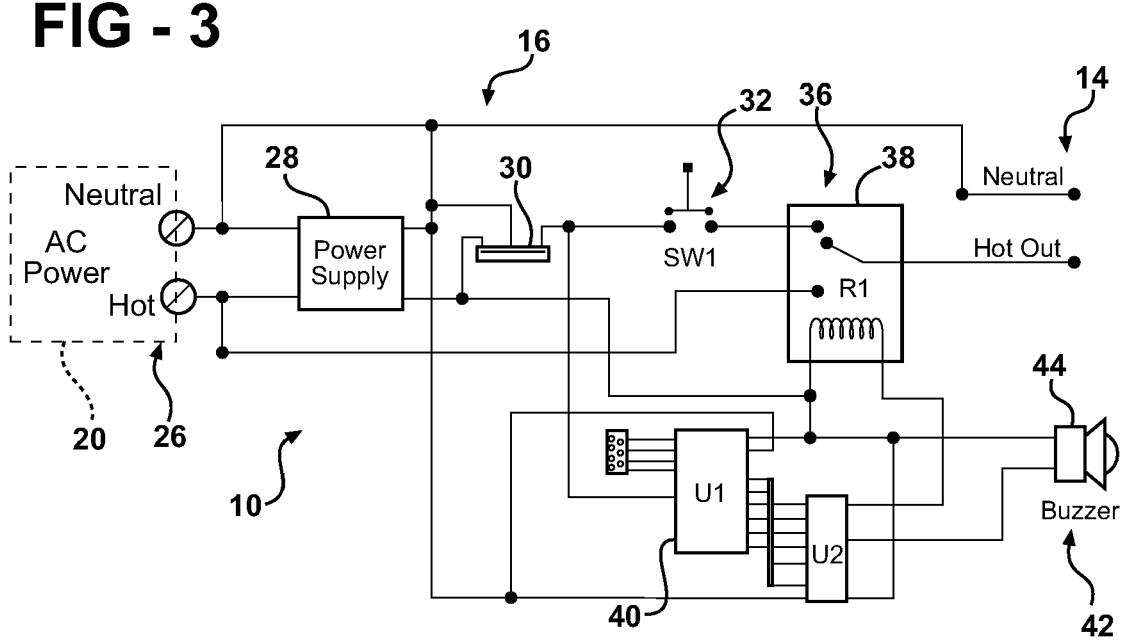
FIG. 3 is a schematic diagram of a singular load sense circuit provided for single plug configurations, according to an embodiment of the present invention.

With reference to FIG. 3, in a second embodiment the apparatus 10 is used in a single application, i.e., includes a single set of output terminals 14. A primary circuit 16 utilizes incoming voltage and current to pass through a power supply 28 (60 mA) where a small amount of current flow through a 5 volt voltage regulator 30 (LM317) to allow a safer and lower voltage to pass through the initial load via a first switch 32. In one aspect, the first switch 32 is located in the neutral side of the female plug insertion and is mechanically actuated by the insertion of adjoining male plug. The 5 volts leaving the voltage regulator 30 junctions to an input of a microcontroller 40 where firmware coding incrementally divides the voltage into 256 segments (0-255 respectively). As the resistance to the 5 volt input increases, the current demand decreases. If there is no resistance then there is a short across the output hot and the output neutral terminals 14 and the load sensing circuit 18 does not actuate a contactor 36 (shown as a relay 38 in the illustrated embodiment). If the resistance is too high for the rating of the plug, the load sensing circuit 18 does not actuate the contactor 36. Pending proper resistance detection, the load sensing circuit 18 actuates the contactor 36. If first and second scenario occurs, the microcontroller 40 can utilize an indicator 42 such as a Buzzer 44 or an LED indicator or both.

Figure 4:
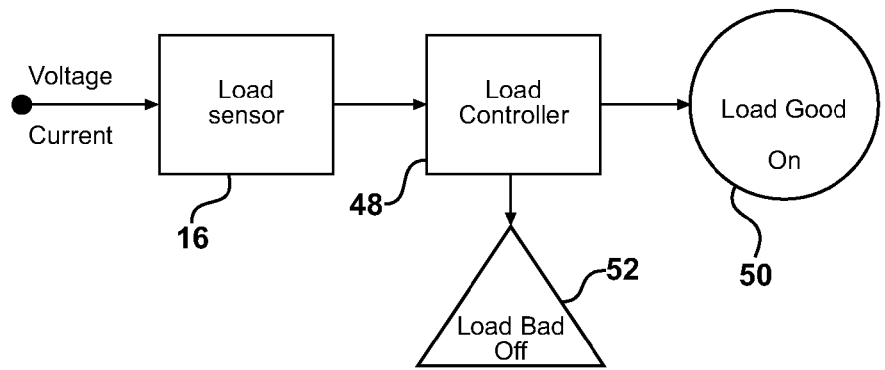
FIG. 4 is a logic flow chart for load sensing circuit, according to an embodiment of the present invention.

FIG. 4 shows a block diagram whereby incoming voltage and current are passed through a load sensor 46 before a load controller 48 allows said voltage and current to pass through to the load 50. If the resistance is too high, the sensor actuates the indicator which indicates the load is out of range of the operational parameters of the receptacle. If the proper resistance is detected, the load sensor 46 may actuates the indicator buzzer in a pulse indicating the voltage and current will pass through to the load 52.

Figure 5:
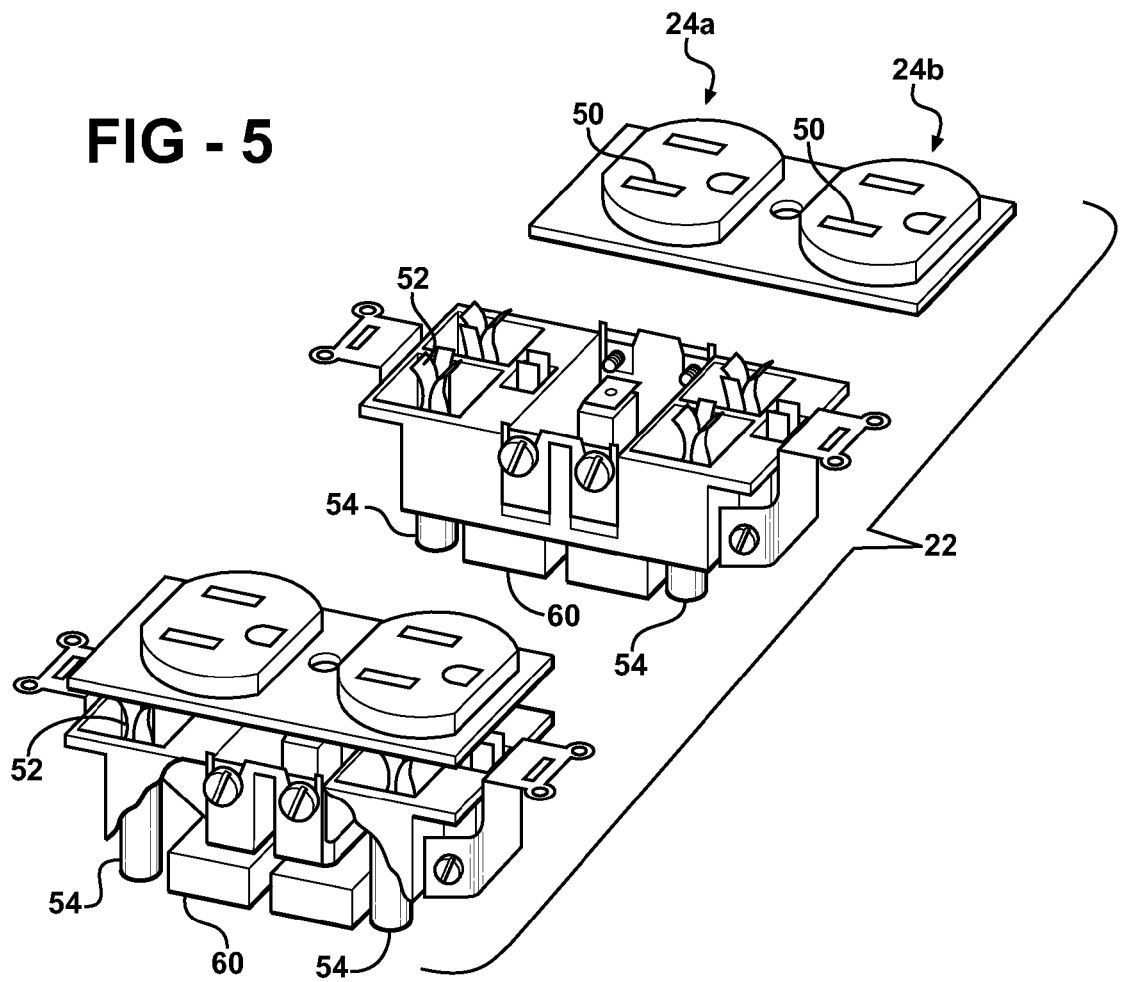
FIG. 5 is an exploded view of an apparatus for providing AC power to a load embodied in a receptacle, according to an embodiment of the present invention.

With specific reference to FIG. 5, the apparatus 10 may be embodied in a two outlet 24A, 24B receptacle 22. The load's electrical plug is inserted into the face of the receptacle 22 via plug prongs. A neutral opening 50 allows the prong to make neutral connection to a soft brass connector 52. Below the connector is a small sensor 54 which is utilized to detect the presence of the neutral prong whereby five (5) volts is present. The five (5) volts travels through the plug prong hot side through the load and to the neutral which acts as ground to the circuit. The load has an associated resistive value which de-saturates a capacitor 58 of an RC circuit 56 (see FIG. 6). This de-saturation time is calculated by using the symbol Tau where Tau is equal to the resistance multiplied by the capacitance. Using this simple equation, the RCTIME can be calculated and allowances of the resistance demand can determine if the load is allowed to be presented with power. Referring to FIG. 5, a relay 60 is located below the receptacle 22 and is further defined in FIG. 8. The relay 60 acts as a 5 volt and 120 volt selector and provides a fail to low voltage solution. The NC aspect of the relay is always to the 5 volt circuit.

FIG. 6 shows a logical flow chart which determines the operational standards of the load requirements during the insertion of the loads plug. The input hardware is defining only one element of the art and each step of the logical diagram provides the solution for the loads properties at the time of load request.

FIG. 7 shows a schematic of a RCTIME circuit, defined by a resistor 62 and the capacitor 56, whereby five (5) volts (702) is passed through a current limiter and junctions to a signal output to a fixed capacitor and out to a hot side brass connector 64 in the receptacle 22. The five volts pass through the load which acts as a resistor to ground (717). The signal of the RCTIME at the signal output depends on the resistance of the load.

Figure 8:
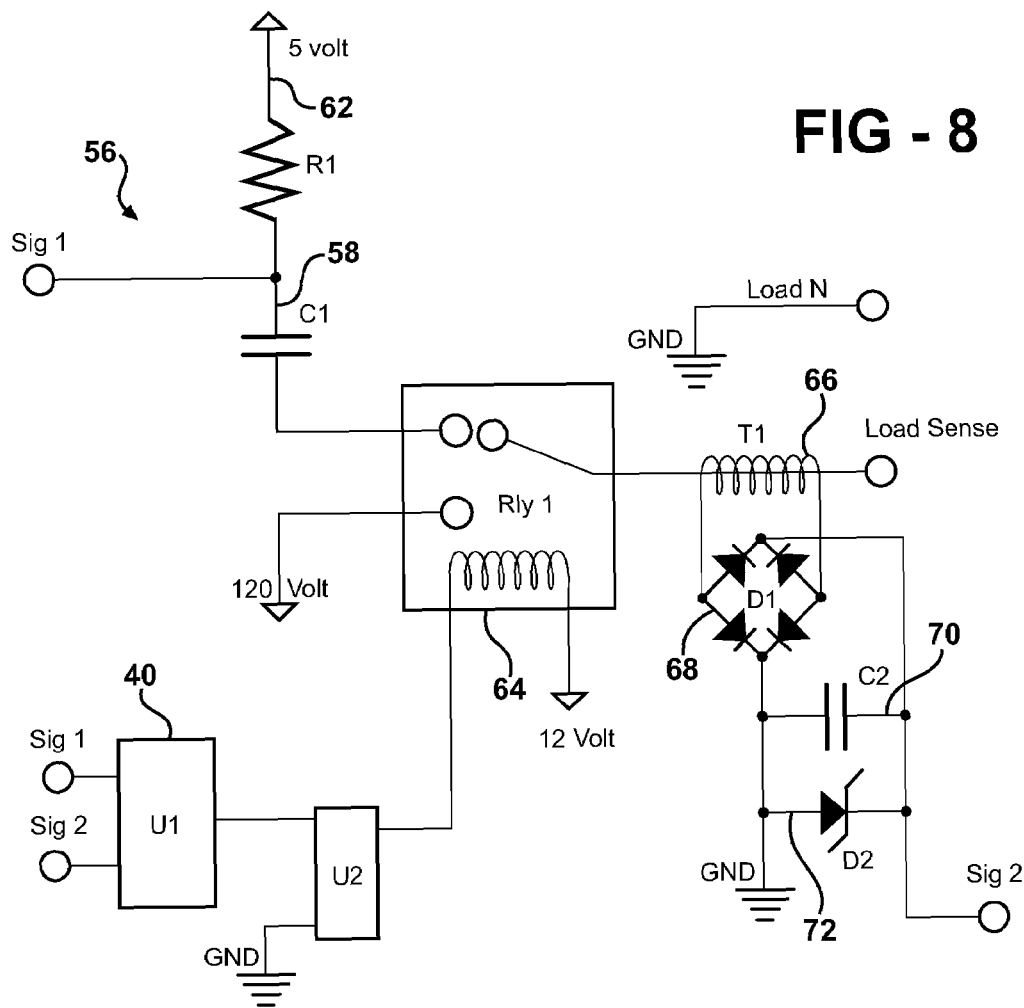
FIG. 8 is a schematic of a five volt neutral sense RCTIME circuit through a Double Pole single Throw Relay further comprising of 120 volt switching circuit and load monitoring schematic diagram, according to an embodiment of the present invention.

FIG. 8 shows a detailed schematic of the RC circuit 56 including a double pole single throw relay 64 to distribute the voltage selection and load activation signal both during the initial request and the Run Time Factor. An inductor 66 provides a current sense of the load during run time where the sensed current is converted to voltage through the primary side of the T1 and is converted to direct current through a Bridge Rectifier 68 and is furthered filtered via a capacitor 70 and is clamped to a 5 volt maximum signal by a diode 72 to prevent damage to the I/O's on the microcontroller 40. The relay 64 is controlled via Darlington or equivalent transistor or transistor packages.

Figure 9:
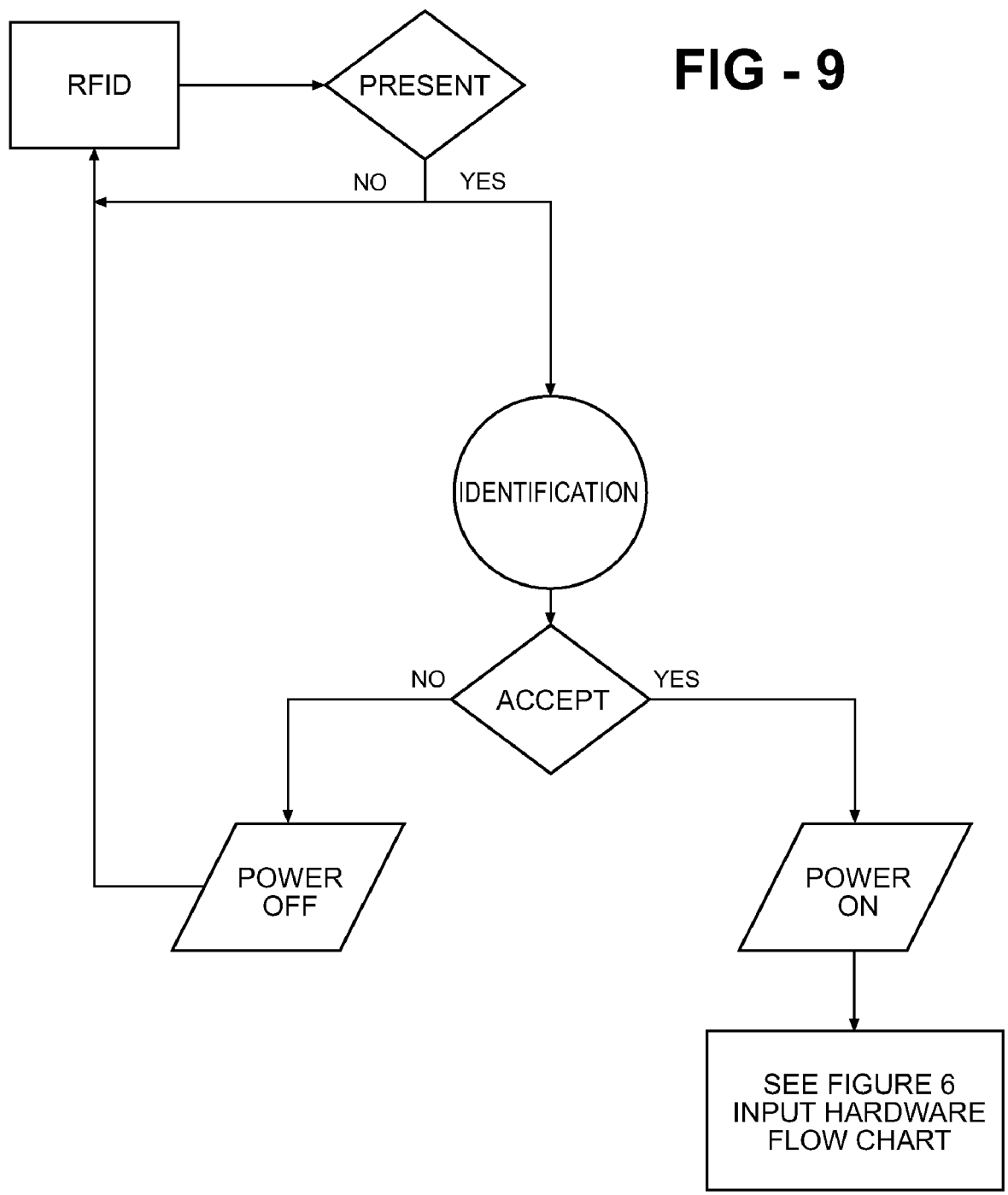
FIG. 9 is a logical flow chart of RFID or equivalent identification circuit, according to an embodiment of the present invention.

FIG. 9 is a logical flow chart for the RFID or equivalent identification methods. The presence of the RFID can control the load request as well as control the load time in which the load is operational. The identification methods of the load can allocate the time or conditions in which the load is operational and allow programming of the identification methods to define user or device dependence upon the receptacle.

Various loads have characteristics which determine the time/current load demands whose inrush current is unique to each load. Each load has a specific operational inductance quantity that measures the electromagnetic induction of an electric circuit component; it is a property of the component itself rather than of the circuit as a whole. The self-inductance of a circuit component determines the magnitude of the electromagnetic force (EMF) induced in it as a result of a given rate of change of the current through the component. Similarly, the mutual inductance of two components, one in each of two separate but closely located circuits, determines the EMF that each may induce in the other for a given current change.

The time required for the capacitor 58 to a predetermined percentage charge of the battery voltage, 63.2%, after the switch is closed is the product of the resistance and capacitance T=(R*C). For example, a 100 uF capacitor and 100K resistor would require 10 seconds to charge to 7.6 volts using a 12 volt battery.

In one embodiment, the microcontroller 40 contains 16 I/O which utilize 4 for the current sense and 4 for the inductance characteristic RCTIME calculations leaving 8 I/Os for expansion. Such expansions include but are not limited to RFID and near magnetic field modulation used by Hewlett Packard Memory Spot chip.

FIG. 10 is an exploded view of the boards of an exemplary receptacle 22, according to an embodiment of the present invention. The top board 74 is the receptacle plug base with brass receivers which contains a neutral side switch 32A under the left neutral side. This switch 32A detects the presence of the plug 34 when inserted properly into the brass receiver 52. This sends a 5 (five) volt signal to the board 76 which analyzes a drop in voltage through a capacitor where 63% of the capacitance drop is detected and counted for comparison in a library contained in the firm ware of the microcontroller's operational program. This is the main component of the receptacle 22 and the other elements create a more safety efficient design. Below is a brief explanation of each element adding to the operation of the receptacle.

An RFID allows the receptacle 22 to utilize a card or pog (not shown) to obtain power from the receptacle which has both onboard firm ware programs to allow different programmable operational parameters of the output power. Not only will it have power allotment but also time of power operation to a particular load. The user may define proper load configuration and demand does not exceed the receptacle's current capacity by overriding the MCU's internal program for proper operation.

In one embodiment of the present invention, a thermometer or temperature sensor 78 may be coupled to the load sensing circuit 18 for sensing an ambient temperature. The load sensing circuit 18 compares the ambient temperature with a predetermined acceptable temperature range and responsively cuts off power to the output terminals if the ambient temperature is outside of the predetermined acceptable temperature range.

In the illustrated embodiment, the thermometer 78 is embedded to the design in order to allow the user to define in the firm ware what ambient temperature is allowed for proper operation of the receptacle 22. If the receptacle detects fire in the vicinity, it may be programmed to shut down out going power to the load to prevent electrical hazard conditions.

In another aspect of the present invention, a relative humidity sensor 80 may be coupled to the load sensing circuit 18 for sensing the relative humidity of air around the apparatus. The load sensing circuit 18 may compare the relative humidity with a predetermined acceptable humidity range and responsively cut off power to the output terminals 14, 14A, 14B if the relative humidity is outside of the predetermined acceptable humidity range. The relative humidity sensor 80 detects the presence of water or moisture in and around the vicinity of the receptacle whereby the user may define in the firmware the allowable humidity of the air in and around the receptacle and determine a control point to remove power to the load. Each environment is different and can be programmed independently to act in a different manner according to the load demand and volatility of the ambient conditions.

The MCU 82 is a microcontroller unit which contains instructions that monitor the load resistive and capacitive characteristics as well as run the sensor elements which drive the operational parameters of the receptacle 22 according to the environmental conditions. The MCU 82 is the brains of the receptacle 22 and various MCU designs can be utilized however it is the RCTIME which is monitored that gives the receptacle the unique capacity to operate with external programs which control the output to each load.

The USB slot 84 is a universal serial bus that allows a CPU to communicate to the receptacle 22 in order to program the receptacle's operational parameter according to user definitions. Other devices may communicate to the MCU through the USB such as a Zwave module which allows wireless communication of the receptacle to report to a central monitoring system or a web servlet can communicate through the web to this device as well to make the receptacle networkable.

A Zwave Module is a wireless module which transmits and receives data at preset data rates. This data can be utilized for various operational settings of the receptacle as well as monitoring the load characteristics of current, voltage and frequency. Line conditions may cause low momentary sags or even high voltage spikes which can damage systems connected to the receptacle. If such conditions go undetected for a prolonged period of time, damage to the load may be eminent. The intelligent arcless receptacle can prevent such actions and allow the user interface to make such events known through alerts given at the monitoring station wirelessly connected to the receptacle. APC (American Power Conversion) is known for their legendary reliability through intelligent power inverters which provide uninterruptible power to loads. Their output power is not monitored in any FIG. 11 shows a down view of the top side of the brass receiver board 74. On the neutral side of the board is a momentary switch 32A which detects the presence of the plug 34 when properly inserted in the receptacle 22. Holes in the top and bottom of the board provide mechanical support as well as electrical connection to the adjacent lower boards through pin standoffs.

FIG. 12 shows a RFID board 86 at the top of a middle board 88 which allows the use of RFID cards or tags which provide operational solutions for overriding the output power by firmware or software user definitions. Below the RFID board 86 is a Relative Humidity and Temperature sensor board 90 which provides a threshold cutoff circuit when moisture and temperature levels are out of operational range of the receptacle. The MCU board 76 is below the RFID and Relative Humidity/Temperature boards 86,90 and provides the control portion of the circuit of the receptacle 22. The board 88 in FIG. 12 is the center board 88 which emanates a USB controller connection to the MCU which controls the relays (bottom of board) via a Darlington transistor array.

FIG. 12 is a power supply with mechanical support pins located at the top of the board which provides electrical connections to the middle controller board. A pin out to the USB board is provided for the communications to the receptacle. 120 volt AC power is converted to 12 volt and 5 volt to provide power for the elements of the receptacle.

Sensors may be added to the design in order to expand on the valuable capabilities of the related art "Shock Safe Receptacle". Temperature controllers can alter the voltage output to allow the user to define the operational parameters of the receptacle to adhere to the necessity of safety and location of the said receptacle. A device may need to operate safely less than 80 degrees and if the receptacle determines the environment exceeds the range of temperature required by the device to operate safely it can turn off the power and alert the user of actions taken which were set by said user cognoscente of the operational temperature requirements. Furthermore the added feature of Relative Humidity assessment by the receptacle allows the user to further control the power distribution to meet or exceed the operational requirements of said device. Further safety is given when the receptacle removes power when conditions warrant such as fire or flooding or even child squirting water in the receptacle face thus preventing and eliminating a possible deadly electrical shock to said child.

The added feature of RFID or Magnetic Field control allows the proper operation or timed operation of the receptacle. Places who have this intelligent receptacle in place can offer use of the receptacle's power for specified time rates. Use of the RFID or Magnetic field allows the device to validate the proper device is plugged in to the receptacle and the user guarantees the device to be safe or proper to the receptacles location.

The use of color sensors can allow scanning of color variation to replace the RFID or Magnetic field for validation of device operation.

The aforementioned concepts utilize programming known to those skilled in the art of PIC programming and various Microprocessor languages such as Standard C or Object Programming could be utilized to achieve the same results and are understood to be elements of the related art. The programming codes can utilize the RCTIME characteristics to determine load types and can prevent or allow said loads to operate with the receptacle. This is known as SMA or Similarity Mapping Algorithms which can determine load characteristics associated with load origination. These intelligent receptacles can monitor the runtime to determine the operational condition of the load to be within the limitations of said loads capacity on the circuit which stems from the electrical panel and leads to each receptacle. The accumulation of the total load on the entire circuit is determined and communicated through wireless or wired means.

Furthermore, this design accommodates a Senserion temperature and humidity chip and it is understood that variations of this hardware may be replaced with other similar components and like elements of the art may be accomplished. The Senserion connects to one of the remaining I/O ports and code representing power control functions or actions due to the Relative Humidity and Temperature regions prohibiting proper operation of the receptacle's power distribution elements.

Optical sensors such as color sensors or coded tag sensors can detect variations which equate to operational parameters. A Color or coded Tag can be scanned in front of the receptacle and allow operational runtime or identify proper operation of the receptacle. Further enhancement of these tags replace the need for RFID or close Magnetic Field reading if consumer chooses this application.

The aforementioned concepts utilize programming known to those skilled in the art of PIC programming and various Microprocessor languages such as Standard C or Object Programming could be utilized to achieve the same results and are understood to be elements of the related art. The programming codes can utilize the RCTIME characteristics to determine load types and can prevent or allow said loads to operate with the receptacle. These intelligent receptacles can monitor the runtime to determine the operational condition of the load to be within the limitations of said loads capacity.

The design will validate the load to operate properly. The design will further validate the load condition once operating and can activate/deactivate power to said load if conditions are programmed to do so. Furthermore the design can utilize a Data Bus, with said bus to include but not limit itself to Wireless, Power Line Carrier, Category 5 Network, USB, Firewire, Serial or Parallel. Various other busses can be utilized to connect to the Microcontroller and allow programming of further elements of related art to be applied.

A number of implementations have been described. Nevertheless, it will be understood that various modifications may be made. Accordingly, other implementations are within the scope of the following descriptions.

A method of sensing the neutral and hot receivers for respectively receiving the neutral contact and the hot contact of the plug, the neutral contact passing through the neutral receiver to the load and supplying low volts to said load to determine RCTIME The method of where the neutral receiver senses low voltage through a low voltage detector.

The method where the low voltage detector can utilize a microcontroller, Microprocessor or other comparable circuits to achieve this method.

The method where the microcontroller utilizes firmware to calculate the voltage loss due to load detection. The method where firmware actuate or sustains the contactor for output voltage. The method further comprising of the firmware actuating a indicator indicating the proper current demand or improper current demand of the load. A method for sensing RFID or equivalent magnetic or electromagnetic field modulations to determine proper accessibility to receptacle. A method further comprising of firmware in a microcontroller or microprocessor or other comparable circuits to achieve this method which validates RFID or equivalent signatures. A method where signatures are deemed acceptable or unacceptable load which respectively supply voltage and current to identified load. A method for determining the RCTIME with a microcontroller or microprocessor or other comparable circuits to achieve the method to validate load originality and accessibility of operation.

A method further comprising of programmable limitations of loads through a port or data bus where bus is USB, Serial or other comparable ports such as wireless or Firewire.

A method for controlling the Time of power of receptacle after validation of load is established. A method of monitoring the load operational parameters. A Method further comprising of load control associated with load condition whereby load condition determines power allotment.

What needs to be pointed out is the need to not only detect an arc but to eliminate the possibility of an arc before it happens. Other elements of the design are inherent to allow the use of technology to expand on the functionality of the receptacle. Before the plug is inserted to the receptacle there is no voltage present at the brass contactors thereby reducing the possibility of a shock to anyone who might insert a metal object into the receptacle. Once the brass contactors are engaged, there is a switch on the neutral side which evokes a 5 (five) volt DC signal through the load to ground to complete a circuit. The five volts passes through a fixed capacitor and out the hot side of the receptacle through the load and to ground. The load has a resistive nature which creates a RC network that gives you the value of Tau where Tau=RC. If the value meets the required limitations the five volts converts to 120 volts AC and gives the load the required operational voltage. It does not quit there because there could have been a soft start circuit in place before the voltage demand thereby giving a false reading to the RC network and fooling the MCU allowance library. So a load monitoring system is put in place which monitors the inrush current and Runtime Factor (RTF) to maintain safety of the receptacle. If by chance the RTF exceeds the operational limitations of the receptacle, a special circuit designed to monitor, control and limit the output power to the load thus preventing a possible hazardous condition. The intelligence of the receptacle is run by a standard MCU (Micro Controller Unit) which has programming to the I/O pins which connect to various circuits responsible for load monitoring and control. These control options can be controlled by software which alters the firm wares interaction with various loads thereby creating a safer receptacle design.

There have been new designs which utilize a comparator circuit for resistance characteristics but these new designs do not take into mind that the load demands have capacitance characteristics as well as resistive characteristics and the resistance measured by the comparator may not represent the load's actual resistive characteristics. A relay which provides a switch circuit has a coil with a resistance of less than 8 ohms however the load itself could have a resistive value of less than an ohm. A direct short to ground could result in a fire if the load demand exceeds the receptacle's current capacity. Our new circuit design takes this into mind while measuring the initial load resistive characteristic, it also has a soft start circuit monitor for runtime factor.

The present invention provides a low cost solution for arc safety and a reduction in risk of electrical shock. The intelligent receptacle utilizes intelligent chip ware to measure the resistance of the load demand and determines if inrush Watts is greater than the specified current rating before energizing the hot side of the receptacle. Electrical receptacle outlets in walls and floors may present shock and electrical fire hazards to consumers.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

The invention claimed is:

1. An apparatus for supplying AC Power to a load, comprising:
   a pair of output terminals;
   a primary circuit electrically coupled to a source of AC power and to the output terminals for selectively providing power at a low voltage at the output terminals or electronically coupling the source of AC power directly to the output terminals, the primary circuit for providing power at the low voltage at the application of the load, the primary circuit including a mechanical switch for detecting application of the load; and,
   a load sensing circuit coupled to the primary circuit and the source of AC power for determining a resistance associated with the load at initial application of the load and controlling the primary circuit to electronically couple the source of AC power directly to the output terminals if a proper load is detected, the load sensing circuit including an RC circuit having a capacitor which supplies an inrush current to the load during application of the load, the amount of time required to discharge the capacitor to a predetermined level being indicative of one of a proper load and an improper load.

2. An apparatus, as set forth in claim 1, wherein the load sensing circuit continues to supply power at the low voltage at least during initial load characteristics associated with the application of the load.

3. An apparatus, as set forth in claim 1, the primary circuit including a switch coupled between the source of AC power and the output terminals and having a first position where power at the low voltage is provided at the output terminals and a second position where the source of AC power is electrically coupled directly to load, the load sensing circuit including a microcontroller coupled to the primary circuit, the microcontroller for monitoring a value of the low voltage during initial application of the load and controlling the switch in response thereto.

4. An apparatus, as set forth in claim 1, including a second pair of output terminals and a second primary circuit, the second primary circuit being electrically coupled to the source of AC power and to the second pair of output terminals for selectively providing power at a low voltage at the second pair of output terminals or electronically coupling the source of AC power directly to the second pair of output terminals, the second primary circuit for normally providing power at the low voltage at the second pair of output terminals when no load is connected to the second pair of output terminals, wherein the load sensing circuit is coupled to the second primary circuit power supply for determining a resistance associated with a second load at the second pair of output terminals at initial application of the second load and controlling the second primary circuit to electronically couple the source of AC power directly to the second pair of output terminals if a proper load is detected at the second pair of output terminals.

5. An apparatus, as set forth in claim 1, wherein the apparatus is embodied in an electrical receptacle, the output terminals being electrically coupled to respective female openings for receiving a respective prong of a plug of the load.

6. An apparatus, as set forth in claim 5, wherein the primary circuit includes a sensor coupled to the load sensing circuit for detecting the presence or insertion of a prong into one of the female openings.

7. An apparatus, as set forth in claim 1, further including an audio and/or visual indicator coupled to the load sensing circuit for providing an indication of a proper or improper load.

8. An apparatus, as set forth in claim 1, the primary circuit including a load detection sensor, the switch coupled to the sensor and the output terminals and having a first position and a second position, the switch being in the first position when no load is present, wherein no power is supplied to the output terminals, and in the second position when a load is present, the switch for detecting application of the load and switching the switch from the first position to the second position.

9. An apparatus, as set forth in claim 1, the load sensing circuit for determining a resistance associated with the load after initial application of the load, if a proper load is not previously detected and confirming that the load is not proper as a function of the resistance associated with the load after initial application of the load.

10. An apparatus, as set forth in claim 1, wherein the load sensing circuit includes a microcontroller.

11. An apparatus for supplying AC Power to a load, comprising:
  a pair of output terminals;
  a primary circuit electrically coupled to a source of AC power and to the output terminals for selectively providing power at a low voltage at the output terminals or electronically coupling the source of AC power directly to the output terminals, the primary circuit for providing power at the low voltage at the application of the load; and,
  a load sensing circuit coupled to the primary circuit and the source of AC power for determining a resistance associated with the load at initial application of the load and controlling the primary circuit to electronically couple the source of AC power directly to the output terminals if a proper load is detected, wherein the load sensing circuit includes a capacitor electrically coupled to the output terminals, the capacitor being charged to an initial predetermined voltage, the load sensing circuit in determining the resistance of the load, senses the time for the capacitor to discharge to a second predetermined voltage level after initial application of the load.

12. An apparatus, as set forth in claim 11, wherein the second predetermined voltage level is approximately 64% of the initial predetermined voltage.

13. An apparatus for supplying AC Power to a load, comprising:
  a pair of output terminals;
  a primary circuit electrically coupled to a source of AC power and to the output terminals for selectively providing power at a low voltage at the output terminals or electronically coupling the source of AC power directly to the output terminals, the primary circuit for providing power at the low voltage at the application of the load; and,
  a load sensing circuit coupled to the primary circuit and the source of AC power for determining a resistance associated with the load at initial application of the load and controlling the primary circuit to electronically couple the source of AC power directly to the output terminals if a proper load is detected, further including a thermometer coupled to the load sensing circuit for sensing an ambient temperature, the load sensing circuit for comparing the ambient temperature with a predetermined acceptable temperature range and responsively cutting off power to the output terminals if the ambient temperature is outside of the predetermined acceptable temperature range.

14. An apparatus for supplying AC Power to a load, comprising:
  a pair of output terminals;
  a primary circuit electrically coupled to a source of AC power and to the output terminals for selectively providing power at a low voltage at the output terminals or electronically coupling the source of AC power directly to the output terminals, the primary circuit for providing power at the low voltage at the application of the load;
  a load sensing circuit coupled to the primary circuit and the source of AC power for determining a resistance associated with the load at initial application of the load and controlling the primary circuit to electronically couple the source of AC power directly to the output terminals if a proper load is detected; and,
  a relative humidity sensor coupled to the load sensing circuit for sensing the relative humidity of air around the apparatus, the load sensing circuit for comparing the relative humidity with a predetermined acceptable humidity range and responsively cutting off power to the output terminals if the relative humidity is outside of the predetermined acceptable humidity range.

15. An apparatus for supplying AC Power to a load, comprising:
  a pair of output terminals;
  a primary circuit electrically coupled to a source of AC power and to the output terminals for selectively providing power at a low voltage at the output terminals or electronically coupling the source of AC power directly to the output terminals, the primary circuit for providing power at the low voltage at the application of the load;
  a load sensing circuit coupled to the primary circuit and the source of AC power for determining a resistance associated with the load at initial application of the load and controlling the primary circuit to electronically couple the source of AC power directly to the output terminals if a proper load is detected; and, a controller for reading a control device and responsively overriding operation of the load sensing circuit.

16. An apparatus for supplying power to a load, comprising:

a pair of output terminals;

a primary circuit electrically coupled to a source of AC power and to the output terminals for selectively providing power at a low voltage at the output terminals or electronically coupling the source of AC power directly to the output terminals, the primary circuit for providing power at the low voltage at the application of the load; and, a load sensing circuit coupled to the primary circuit and the source of AC power for determining a resistance associated with the load at initial application of the load and controlling the primary circuit to electronically couple the source of AC power directly to the output terminals if a proper load is detected, the primary circuit including a load detection sensor and a switch coupled to the sensor and the output terminals and having a first position and a second position, the switch being in the first position when no load is present, wherein no power is supplied to the output terminals, and in the second position when a load is present, the switch for detecting application of the load and switching the switch from the first position to the second position, wherein the apparatus is embodied in an electrical receptacle, the output terminals being electrically coupled to respective female openings for receiving a respective prong of a plug of the load, wherein the sensor is a mechanical switch for detecting the presence or insertion of a prong into one of the female openings.

17. An apparatus for supplying AC power to a load, comprising:

a primary circuit electrically coupled to a source of AC power, the source of AC power having a neutral terminal and a positive terminal, the primary circuit including:

a mechanical switch for detecting application of the load;

a power supply and voltage regulator circuit being electrically coupled to the neutral and positive terminals and supplying power at a low voltage;

a first switch coupled to the power supply and voltage regulator circuit, for sensing application of a load and responsively electrically coupling the power supply and voltage regulator circuit to the load;

a second switch electrically coupled between the first switch and the load and having a first position where the first switch and the load are electrically coupled and a second position where the source of AC power is electrically coupled directly to load; and, a load sensing circuit coupled to the power supply and voltage regulator circuit for determining a resistance of the load after application of the load and controlling the switch to move to the second position if a proper load is detected, the load sensing circuit including an RC circuit having a capacitor which supplies an inrush current to the load during application of the load, the amount of time required to discharge the capacitor to a predetermined level being indicative of one of a proper load and an improper load.

18. An apparatus, as set forth in claim 17, the load sensing circuit for determining a resistance associated with the load after initial application of the load, if a proper load is not previously detected and confirming that the load is not proper as a function of the resistance associated with the load after initial application of the load.

19. An apparatus, as set forth in claim 17, wherein the load sensing circuit includes a microcontroller.

20. A receptacle for supplying AC power to a load, the load having an associated electrical plug, the receptacle comprising:

a set of outlet terminals;

an outlet for receiving the electrical plug associated with the load, the outlet having at least two associated electrical connectors electrically coupled to the outlet terminals for providing electrical connection to associated prongs of the electrical plug;

a primary circuit electrically coupled to a source of AC power and to the output terminals, the source of AC power having a neutral terminal and a positive terminal, the primary circuit including:

a mechanical switch for detecting application of the load;

a power supply and voltage regulator circuit being electrically coupled to the neutral and positive terminals and supplying power at a low voltage;

a first switch coupled to the power supply and voltage regulator circuit, for sensing insertion of the electrical plug into the outlet and responsively electrically coupling the power supply and voltage regulator circuit to the load;

a second switch electrically coupled between the first switch and the output terminals and having a first position where the first switch and the output terminals are electrically coupled and a second position where the source of AC power is electrically coupled directly to the output terminals; and, a load sensing circuit coupled to the power supply and voltage regulator circuit for determining a resistance of the load after insertion of the electrical plug into the outlet and controlling the switch to move to the second position if a proper load is detected the load sensing circuit including an RC circuit having a capacitor which supplies an inrush current to the load during application of the load, the amount of time required to discharge the capacitor to a predetermined level being indicative of one of a proper load and an improper load.

\* \* \* \* \*